Oct. 27, 1953

J. S. JUDD 2,656,887

BLANKING DIE

Filed Oct. 11, 1948

Inventor
John S. Judd
By *(signature)* Attys

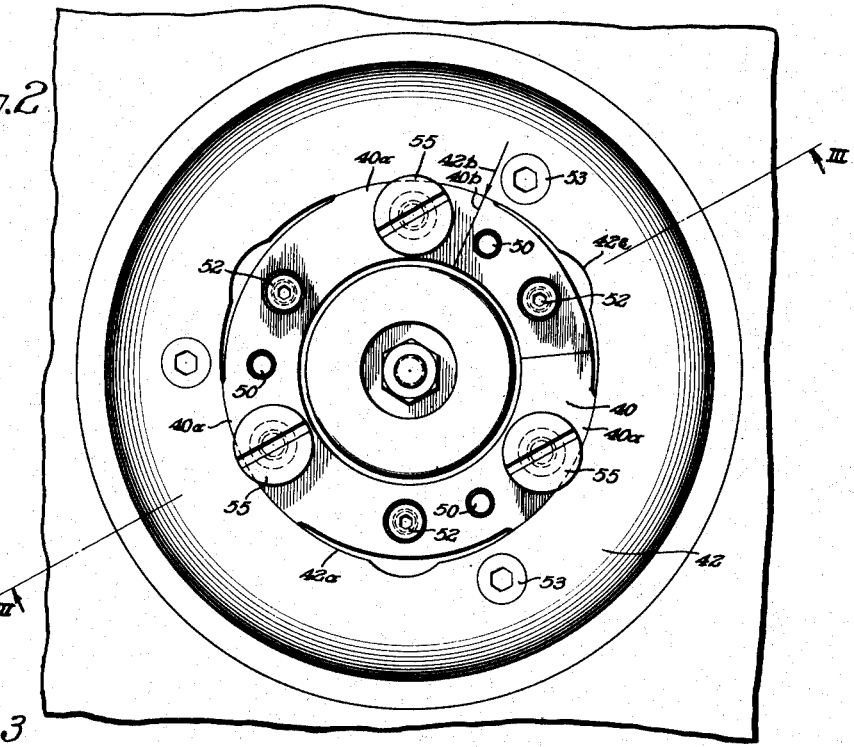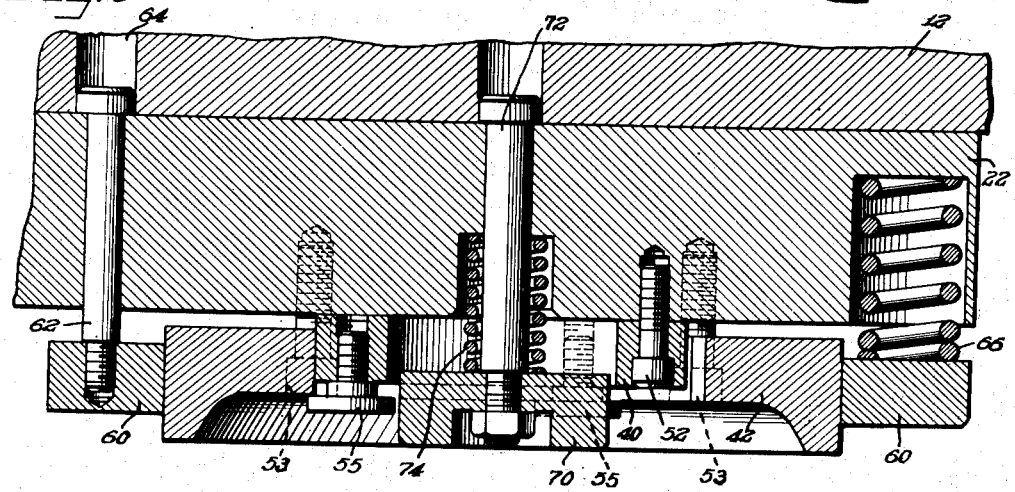

Patented Oct. 27, 1953

2,656,887

UNITED STATES PATENT OFFICE 2,656,887

BLANKING DIE

John S. Judd, Detroit, Mich., assignor to Lyon, Incorporated, Detroit, Mich., a corporation of Delaware Application October 11, 1948, Serial No. 53,911

7 Claims. (Cl. 164—33)

This invention relates to an improved die assembly and more particularly to a blanking die assembly with a replaceable shearing edge and especially adapted for use where manufacturing tolerances are extremely limited.

In the operation of blanking dies, where blanks are cut from sheet stock, the cutting or shearing edges of the upper and lower dies naturally become worn. The usual practice is to remove the worn dies, cut off the worn shearing edges and put in a new piece of metal. This practice of removing the dies, replacing the cutting edges and replacing the dies necessarily causes a delay in the production of the press. One disadvantage to such a practice is encountered in the tedious operation of replacing the die in a truly centered position for operation within the allowable tolerance.

An object of this invention is to provide a die assembly with novel means for replacing worn cutting or shearing edges in such manner that the new edge can be centered with precision with respect to the other die parts.

Another object of this invention is to provide a die assembly which may be readily disassembled for repair of parts or for substitution of parts.

Another object of this invention is to provide a die assembly which may be readily assembled for blanking operations within close tolerance.

A further object of this invention is to provide a blanking die assembly which need not be completely disassembled for the removal and replacing of the shearing parts.

Another object of this invention is to provide an improved method of aligning and interconnecting concentric die rings of a die whereby one of the rings may be easily disengaged from the other for replacement or repair as desired without necessitating removal of the die from the press.

In accordance with the general features of this invention, there is provided in a die assembly including a punch press having a ram and a bed, a pair of concentric die rings disposed in the ram assembly of the press and a pair of concentric die rings disposed in the bed assembly of the press, the radially outer ring of the ram assembly having a shearing edge which cooperates with a shearing edge on the radially inner ring of the bed assembly to cut a blank from a sheet of stock fed into the press.

Another feature of the invention relates to the mounting of the aforesaid pairs of rings in true concentricity with respect to the axis of the die by rotating one ring of a pair with respect to the other ring of a pair until protuberances on the periphery of one of the rings are firmly cammed or wedged against cooperating camming or wedging surfaces on the periphery of the other ring of the pair.

Another feature of the invention relates to the securing of one of the rings of each of the aforesaid pairs to its respective press part (either the ram or the bed) so that the other ring of the respective pair may be rotated relative to the secured ring and disengaged from the aforesaid wedging engagement without disturbing the other parts of the press or die assembly.

Yet another feature of the invention relates to the machining of the rings so that one ring of either of the aforesaid pairs may be removed and an easily machined duplicate ring may be substituted without necessitating a complete breakdown of the die or press assembly and without necessitating inoperation of the punch press for more than a short time interval.

Other objects and features of this invention will more fully appear from the following detailed description taken in conjunction with the accompanying drawings which illustrate one embodiment thereof and in which:

Figure 2 is an enlarged, fragmentary, bottom plan view of the upper die or ram portion of the die assembly of Figure 1;

Figure 3 is a fragmentary, cross sectional view taken substantially on line III—III of Figure 2 looking in the direction of the arrows, and is similar to that portion of Figure 1, but shows the shearing or cutting ring of the upper die assembly partially disassembled for removal from the assembly;

As shown in the drawings:

Figure 1:
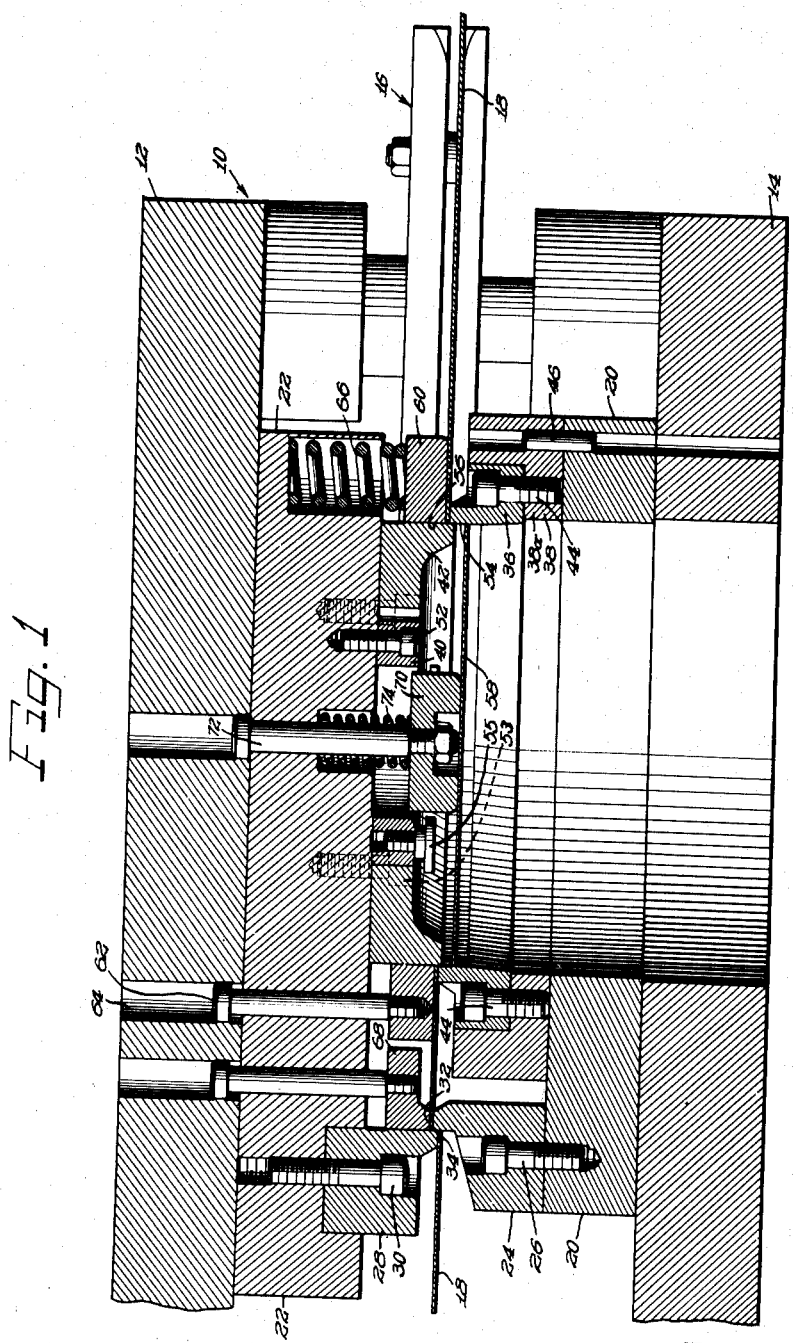
Figure 1 is a fragmentary longitudinal cross sectional view of a die assembly embracing the features of this invention.

It is believed that my novel method of assembling die rings will be best and fully understood from the following description of an apparatus for practicing the same.

The reference numeral 10 designates generally a punch press assembly having an upper or ram member 12, a lower or bed member 14 and an integrally mounted guide member 16 for guiding a sheet of stock 18 into the assembly 10. A lower die block 20 is conventionally secured to the press bed 14 and an upper die block 22 is likewise conventionally secured to the hammer or ram section 12 of the press.

A lower transverse cutting or trimming die 24 is secured to the innermost edge of the lower die block 20 as by bolts 26. The lower die 24 cooperates with an upper transverse trimming die 28 which is secured to the upper die block 22 as by the bolts 30 to transversely trim the sheet stock 18.

The punch press assembly 10, as shown in Figure 1, is but one machine in a production line and to facilitate rapid production long strips of the sheet stock 18 are fed into the machine from the right hand side to the left hand side as shown in the figure, and completely punched sections of the stock 18 are completed in two punching operations.

The first punching operation cuts a blank from the midsection of the stock and trims the forward edge of the stock with the transverse dies 24 and 28. After the first punching operation the stock 18 is further passed from right to left until the forward edge 32 of the stock section rests against a stop (not shown) at which time another punching operation occurs which transversely trims the trailing edge 34 of the stock section as well as trimming the leading edge 32 of the following stock section which is at the same time blanked at its mid-section.

Figure 5:
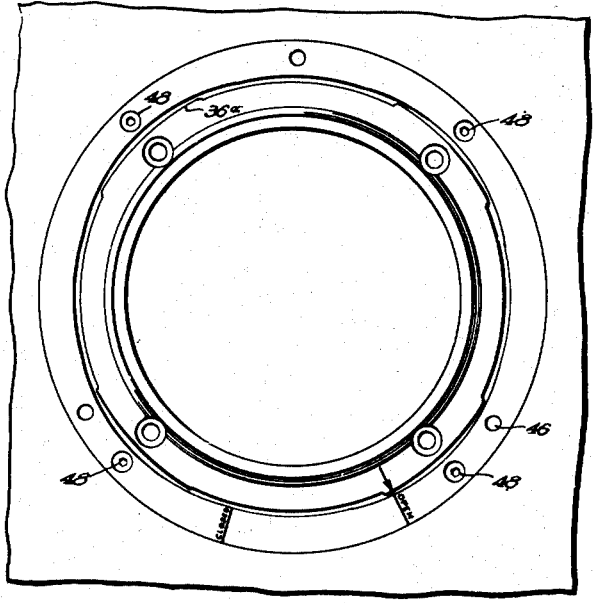
Figure 5 is a view similar to Figure 4, but showing the radially inner die ring in a revolved position for removal from the die assembly of Figure 1.

The aforementioned blanking of the midsection of the stock is accomplished by a pair of lower circular members comprising die rings 36 and 38 cooperating with a pair of upper circular members in the form of die rings 40 and 42. The lower die rings 36 and 38 are secured to one another by a limited area press fit relationship with uniform substantially wedging effect and which will be described in more detail later and are additionally secured to one another by a plurality of bolts 44. The radially outer lower die ring 38 is conventionally centered and positioned on the lower die block 20 as by a plurality of dowel pins 46 and is secured to the lower die block 20 by a plurality of bolts 48 (Figure 5).

The upper die rings 40 and 42 are secured to each other by a similar limited area press fit relationship with uniform substantially wedging effect to be described in more detail later. The radially inner upper die ring 40 is positioned and centered on the upper die block 22 as by a plurality of dowel pins 50 (Figure 2) and is secured to the upper die block 22 as by a plurality of bolts 52. The radially outer ring 42 when secured to ring 40 is additionally secured to the block 22 as by bolts 53.

The radially inner edge 54 of the radially inner ring 36 of the lower die ring assembly cooperates with the radially outer edge 56 of the radially outer ring 42 of the upper pair of die rings to cut a blank 58 from the sheet stock 18.

As previously stated, sheet stock 18 is fed into the die assembly 10, the feeding being guided by the guide assembly 16, until the leading edge of the stock 18 rests against a stop which is not shown. A further securing or clamping of the stock 18 is necessary for the punching operation and is accomplished by a pad ring 60 which yieldably presses against the stock 18 when the hammer or ram portion 12 of the punch press is lowered for blanking the stock 18. The pad ring 60 is vertically slidably secured to the ram 12 by a plurality of peripherally spaced stem bolts 62 threaded at their lower extremities into the securing ring 60.

As illustrated in Figure 1, the heads of the bolts 62 can vertically slide in the drilled out portions 64 of the ram 12. Vertical pressure of the pad ring 60 against the stock 18 is accomplished by placing a number of peripherally spaced compression springs 66 on top of the ring 60 and embedded in suitable cavities in the uper die block 22. A similar arrangement (Fig. 1) for securing the stock 18 near the transverse trimming dies 24 and 28 is accomplished by the use of a transverse damping member or pad 68.

A somewhat similar compressive arrangement is utilized for stripping or striking the blank 58 from the die assembly 10. Here a centrally located stripper punch 70 is vertically slidably mounted as by the stem bolt 72 to the ram 12. A compression spring 74 is located about the stem 72 which is secured to the stripper punch 70. The spring 74 rests on top of the punch 70 and is compressed within a central cavity in the upper die block 22. The stripper punch 70 presses against the stock 18 before the blank 58 is cut and when the blank 58 has been severed, the downward force of the spring 74 is then released to shove the stripper punch 70 against the blank 58 downwardly so that the blank 58 will fall from the die assembly 10.

Upon reference to Figures 2 and 3 the novel means of the present invention for mounting the upper die members 40 and 42 in truly concentric relation will be readily understood. As best seen in Figure 2, these are a series of equally spaced (herein three) outer peripheral areas or portions 40a of substantial arcuate dimension and radially outwardly offset from the remainder of the outer periphery on the radially inner ring 40. The arcuate portions 40a are formed on a common circle, as shown, and preferably comprise smaller arcuate portions of the ring periphery than the intermediate inset areas of the ring periphery. On the inner periphery of the ring 42 which in assembly opposes the outer periphery of the ring 40, are provided cut-out periphery or inset clearance cavities or portions 42a equal or larger in number to but of larger arc than the portions 40a. Intermediate the inset inner peripheral portions 42a, the inner periphery of the ring 42 is formed complementary on a common circle closely equal to and within press fit tolerance with respect to the arcuate portions 40a of the inner ring.

It is apparent from the illustration that the assembly may be accomplished by placing the ring 42 about the ring 40 with the portions 40a adjacent the portions 42a on the outer ring 42. From this position the outer ring 42 may be rotated as by a spanner wrench (not shown) to a position where a registration line 40b marked on the outer surface of the ring 40 becomes aligned with an arrow 42b marked on the outer surface of the ring 42. In this position the radially greater portions 40a of the inner ring 40 are pressing tightly substantially throughout their arcs against the intermediate common circle portions of the inner periphery of the outer ring 42 so that there will be no relative shifting of the rings 40 and 42. In this position the rings are perfectly concentrically aligned. The dowel pins 50, the inner ring retaining bolts 52 and the outer ring retaining bolts 53 secure the pair from movement relative to the die black 22.

When it is desired that the outer or cutting ring 42 be removed from the upper portion of the press for sharpening or substitution of parts, it is easily accomplished by the removal of the bolts 53 and the lowering of the ring 42. The flange headed bolts 55 located in the inner ring 40 will not permit the complete removal of the outer ring 42 until it has been rotated to a position where cut out portions 42c are aligned to clear the flanged heads on the bolts 55. This is to insure against the sudden dropping of the outer ring 42 when it is removed from the die block 22 wherein damage to the ring 42 or its cutting edge could occur.

Figure 4:
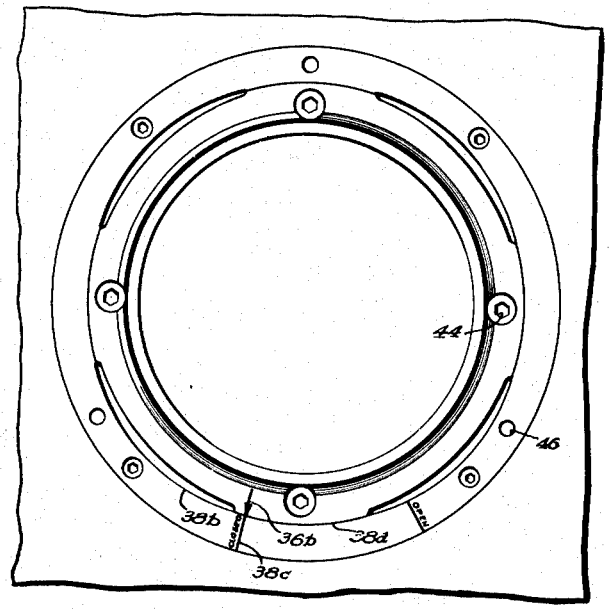
Figure 4 is a fragmentary, top plan view of the lower die section of the die assembly of Figure 1, showing the die rings in position for blanking operation.

With reference to Figures 4 and 5 it is seen that the lower pair of rings 36 and 38 (of Fig. 1) are similarly arranged for positioning and securement. However, in the case of the lower pair the radially outer ring 38 is secured to the lower die block 20 but the radially inner ring 36 is not secured directly to the die block 20. The radially inner ring rests against an inner flange portion 38a (Fig. 1) of the radially outer ring 38 and is secured to the outer ring 38 as previously mentioned by bolts 44.

When the radially outer ring 38 has been positioned on the die block 20 as by the dowel pins 46 and is secured in place by the bolts 48 the radially inner ring is inserted within the radially outer ring, the inner ring having radially outwardly extending equidistantly spaced arcuate portions 36a (herein four in number) of substantially arcuate, though limited extent formed on a common circle on its outer periphery which initially reside within radial clearance cavities 38b on the inner periphery of the outer ring 38 as shown in in Figure 5. The inner ring is then rotated as by a spanner wrench (not shown) to a position wherein an arrow 36b imprinted on its upper surface aligns with a line 38c on the upper surface of the outer ring 38. In this position the radially inner ring exerts terrific compressive force upon the radially outer ring through the radially greater, arcuate portions 36a pressing against the inner periphery of the radially outer ring 38 in concentric arcuate areas intermediate the cavities 38b, such intermediate arcuate areas being formed on a common circle complementary and closely equal to and within press fit tolerance relation to the arcuate portions 36a. Also in this position the ring pair is concentrically located and the bolts 44 may be placed to additionally secure the inner ring 36 to the outer ring 38. The reverse operation is followed to remove the inner or cutting ring 36 for sharpening or for substitution of a new ring in the die.

From the foregoing it may be seen that by positioning one ring of a pair on a die block and by following the operations made possible through the use of the features of this invention, that the cutting rings or cutting members of a die assembly may be readily assembled or disassembled without a complete disassembly of the punch press die assembly thus cutting down the loss of time from production. Another advantage of this construction lies in the ease with which pairs of die rings may be concentrically located and maintained in such concentricity through long periods of operation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a punch press type of die assembly, a pair of die members one of which has a radially outwardly facing periphery and the other of which has a radially inner periphery, with said peripheries complementary and in opposition in the assembly of the members, limited segmental peripherally spaced areas of said peripheries being formed on substantially complementary concentric press fit circularity with major intermediate portions of each of the peripheries inset so that the die members can be assembled by initially disposing the common circular segmental areas of the respective peripheries in the inset areas of the opposing periphery and then relatively turning the members to bring the common circular peripheral segmental areas into engagement with substantially, press fit effect to attain true concentricity of the die members.

2. In a punch press type of die assembly, a pair of die members one of which has a radially outwardly facing periphery and the other of which has a complementary radially inner periphery, with said peripheries in opposition in the assembly of the circular members, limited segmental peripherally spaced areas of said peripheries being formed on substantially complementary concentric press fit circularity with major intermediate portions of each of the peripheries inset so that the die members can be assembled by initially disposing the common circular segmental areas of the respective peripheries in the inset areas of the opposing periphery and then relatively turning the members to bring the common circular peripheral segmental areas into engagement with substantially press fit effect to attain true concentricity of the die members, said die members having registering indicia means thereon to indicate full relative rotary assembly and each of said die members having means for holding the same against unintentional relative rotary disassembly.

3. In a punch press type of die assembly, a first die member, a second die member, said die members having opposing peripheral surfaces, said peripheral surfaces having opposing complementary press fit common center circular areas and intermediate inset areas, the common center circular areas being of smaller arcuate dimension than the intermediate offset areas so that the members can be assembled by initially disposing the common center circular peripheral areas thereof in opposing relation to the respective opposite inset peripheral areas and thereafter relatively turning the second member with respect to the first member until the common circular areas are in press fit relationship to maintain the members concentric, and means for securing the second member against relative rotation after concentricity has been attained.

4. In a punch press type of die assembly, a first die member, a second die member, said die members having opposing peripheral surfaces, said peripheral surfaces having opposing complementary press fit common center circular areas and intermediate inset areas, the common center circular areas being of smaller arcuate dimension than the intermediate offset areas so that the members can be assembled by initially disposing the common center circular peripheral areas thereof in opposing relation to the respective opposite inset peripheral areas and thereafter relatively turning the second member with respect to the first member until the common circular areas are in press fit relationship to maintain the members concentric, and means interconnecting said die members for securing the second member against relative rotation after concentricity has been attained, said members having registration markings showing when the members are in full relative rotary assembled relation.

5. In a punch press type of die assembly, a die holder, a first die member secured to said die holder, a second die member, said die members having opposing peripheral surfaces, said peripheral surfaces having opposing complementary press fit common center circular areas and intermediate inset areas, the common center circular areas being of smaller arcuate dimension than the intermediate offset areas so that the members can be assembled by initially disposing the common center circular peripheral areas thereof in opposing relation to the respective opposite inset peripheral areas in an initial relationship and thereafter relatively turning the second member with respect to the fixed member until the common areas are in press fit relationship to maintain the members concentric, and means for securing the second member to said die holder to prevent relative rotation between said die members after concentricity has been attained, one of said members having means thereon to retain the members against axial separation when the members are in substantially said initial relationship.

6. In a reciprocable stroke die assembly, relatively rotatable die rings, one of said rings having a shearing edge, registering means on each of said rings for registering concentricity of said rings, and means including radial, spaced concentric-circle-axis segmental arcuate protuberances on one of said rings engageable with spaced complementary press fit concentric-circle-axis segmental arcuate areas on the other ring upon relative rotation of said rings in one direction for securing them with substantially press fit effect into register at true concentricity and disengageable upon relative rotation in an opposite direction to bring the ring carrying the shearing edge into a position wherein it may be removed for replacement, said protuberances and areas acting in a radial direction to place said ring having a shearing edge under compressive force directed to maintaining said edge substantially concentric to the axis of the stroke of the die.

7. In a die assembly of the character described, a pair of die members adapted to be attached to the underside of a press ram, said members being of complementary structure to fit one within the other and having opposing complementary mutually cooperative interengagement surfaces alternating with clearance surface areas so that the members can be secured in fixed relation to one another by relative turning of the members and can be separated by relative turning, one of said members having means thereon extending into marginal underlapping supporting relation to the other of said members for supporting the latter while the members are relatively turned out of secured relation with the interengagement surface of one member registered with the clearance area of the other member, the margin of the underlapped member having clearance recesses in said clearance areas thereof registrable with said means for dropping of the underlapped member out of assembly or replacing the same into the assembly.

JOHN S. JUDD.

References Cited in the file of this patent

UNITED STATES PATENTS

| Number | Name | Date |
|---|---|---|
| 429,489 | Wadleigh | June 3, 1890 |
| 430,892 | Shimer | June 24, 1890 |
| 954,304 | Kenney | Apr. 5, 1910 |
| 974,932 | Traub | Nov. 8, 1910 |
| 1,270,933 | Elsener | July 2, 1918 |
| 1,504,182 | Carter | Aug. 5, 1924 |
| 2,198,922 | Shaw | Apr. 30, 1940 |
| 2,326,091 | Zabriskie | Aug. 3, 1943 |
| 2,397,382 | Smith | Mar. 26, 1946 |
| 2,560,110 | Horn | July 10, 1951 |

FOREIGN PATENTS

| Number | Country | Date |
|---|---|---|
| 558,868 | Great Britain | Jan. 25, 1944 |